(12) United States Patent
Moore et al.

(10) Patent No.: US 9,678,366 B2
(45) Date of Patent: Jun. 13, 2017

(54) NOVELTY SHADES

(71) Applicants: Jay Moore, Le Claire, IA (US); Brad Akers, Chicago, IL (US)

(72) Inventors: Jay Moore, Le Claire, IA (US); Brad Akers, Chicago, IL (US)

(73) Assignee: Tip-Top Branding, LLC, Chicago, IL (US)

( * ) Notice: Subject to any disclaimer, the term of this patent is extended or adjusted under 35 U.S.C. 154(b) by 0 days.

(21) Appl. No.: 14/219,845

(22) Filed: Mar. 19, 2014

(65) Prior Publication Data

US 2014/0204332 A1 Jul. 24, 2014

Related U.S. Application Data

(63) Continuation-in-part of application No. 12/954,315, filed on Nov. 24, 2010, now abandoned.

(51) Int. Cl.
 *G02C 11/02* (2006.01)
(52) U.S. Cl.
 CPC .................................... *G02C 11/02* (2013.01)
(58) Field of Classification Search
 CPC . G02C 11/02; G02C 5/00; G02C 5/02; G02C 5/006; G02C 5/008; G02C 1/04; G02C 2200/02; G02C 3/003
 USPC .............................. 351/51–52, 156, 158, 120
 See application file for complete search history.

(56) References Cited

U.S. PATENT DOCUMENTS

| 2,393,837 | A | * | 1/1946 | Swanson | 351/62 |
| 3,179,954 | A | * | 4/1965 | Weitzner | A42B 1/16 132/53 |
| 3,858,590 | A | * | 1/1975 | Lowery | A45D 8/00 132/275 |
| 4,820,036 | A | * | 4/1989 | Seet | G02C 3/003 351/156 |
| 4,909,620 | A | | 3/1990 | Saccone | |
| 5,151,778 | A | * | 9/1992 | Conley | A45C 11/04 2/452 |
| 5,423,091 | A | * | 6/1995 | Lange | A45D 44/12 2/174 |
| 5,451,045 | A | | 9/1995 | Garke | |
| 5,497,211 | A | | 3/1996 | McNulty | |
| 5,764,338 | A | | 6/1998 | Mack | |
| 6,568,804 | B1 | * | 5/2003 | Lin | 351/52 |
| 7,621,633 | B1 | | 11/2009 | Foster | |
| 2003/0024033 | A1 | * | 2/2003 | Viggiano | 2/209.13 |

(Continued)

*Primary Examiner* — Scott J Sugarman
*Assistant Examiner* — Vipin Patel
(74) *Attorney, Agent, or Firm* — Tolpin & Partners, PC; Thomas W. Tolpin

(57) ABSTRACT

Attractive eyeglasses and novelty shades are provided that are fun and entertaining and can be worn at sporting events, pep rallies, amusement parks, popular concerts, car races, parties, with costumes, and at other places. The improved eyeglasses and novelty shades can comprise an eye glass assembly with a novelty connected to an eyeglass frame. Desirably, the novelty comprises a headband or a part of at least one imitation vehicle. The headband can comprise a unitary one-piece headband or an interlocking multiple piece headband. The headband can further comprises a decorative portion, such as an imitation crown, tiara, coronet, or wreath. Preferably, the attractive imitation vehicle has at least one wheel well which is positioned about one of the earpieces of the eyeglass frame.

7 Claims, 16 Drawing Sheets

(56) References Cited

U.S. PATENT DOCUMENTS

| | | | |
|---|---|---|---|
| 2005/0132477 A1* | 6/2005 | Thorson | 2/426 |
| 2006/0080759 A1* | 4/2006 | Hudson | A42B 1/004 2/209.13 |
| 2008/0202548 A1* | 8/2008 | Fala | A45D 8/36 132/275 |
| 2008/0239232 A1* | 10/2008 | Guerrero | 351/52 |
| 2009/0066908 A1* | 3/2009 | Esses | 351/52 |
| 2009/0273754 A1* | 11/2009 | Ridgeway | G02C 11/02 351/52 |
| 2010/0315586 A1* | 12/2010 | Mansuy | G02C 11/02 351/52 |

* cited by examiner

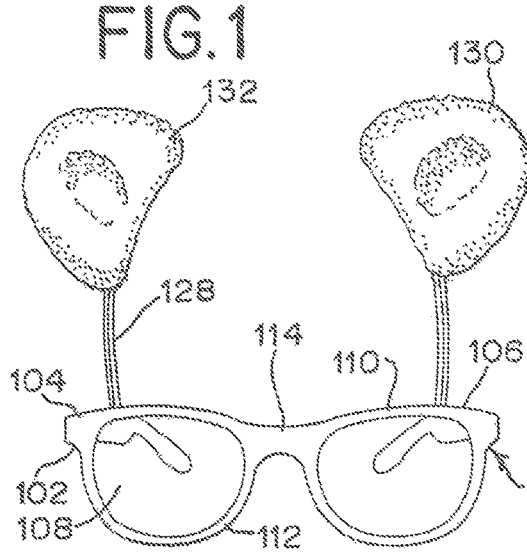
FIG.1 GLASSES WITH ANIMAL EARS
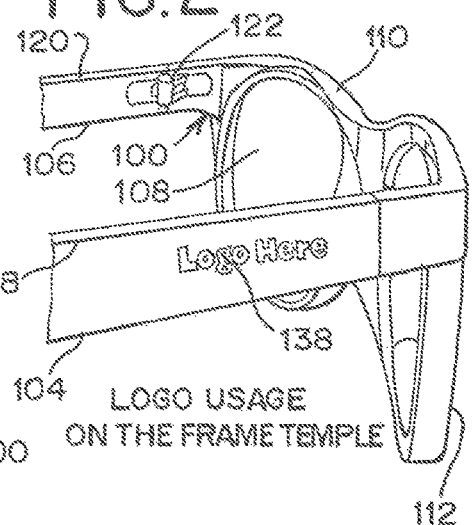
FIG.2 LOGO USAGE ON THE FRAME TEMPLE
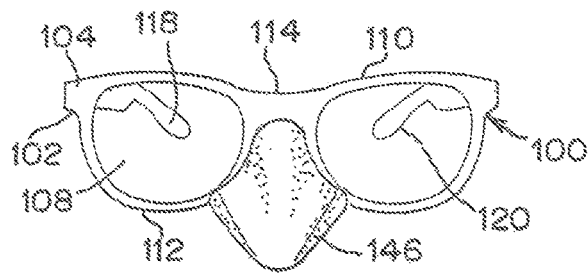
FIG.3 GLASSES WITH BIRD BEAK
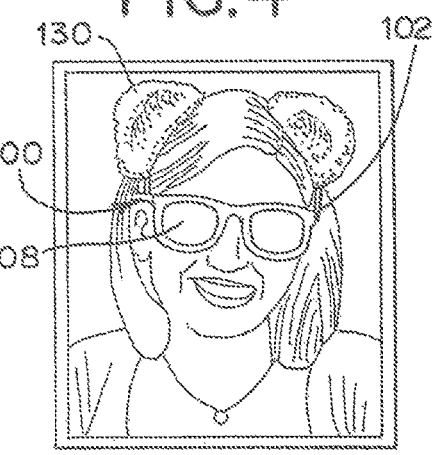
FIG.4
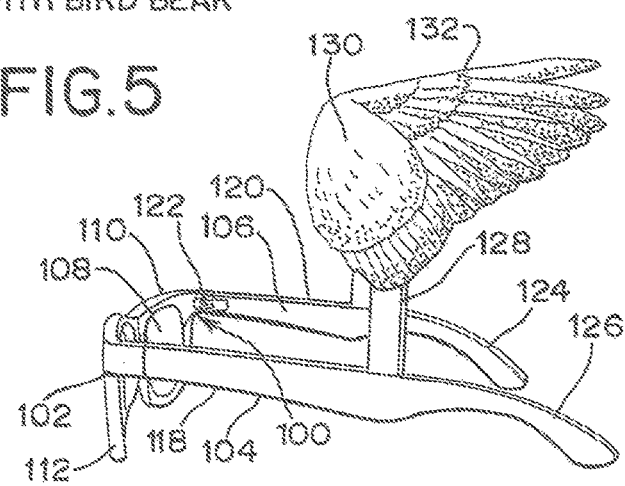
FIG.5 GLASSES WITH BIRD WINGS

ELVIS SIDEBURN GLASSES

MONKEY

GORILLA

GIRAFFE

LION

TIGER

BEAR/CUB/PANDA

WOLF

DOG

CAT

ELEPHANT

HIPPO

PANTHER

ALLIGATOR

BUCK

BULL

MOOSE

HORSE

BUNNY

COW

MOUSE

KANGAROO

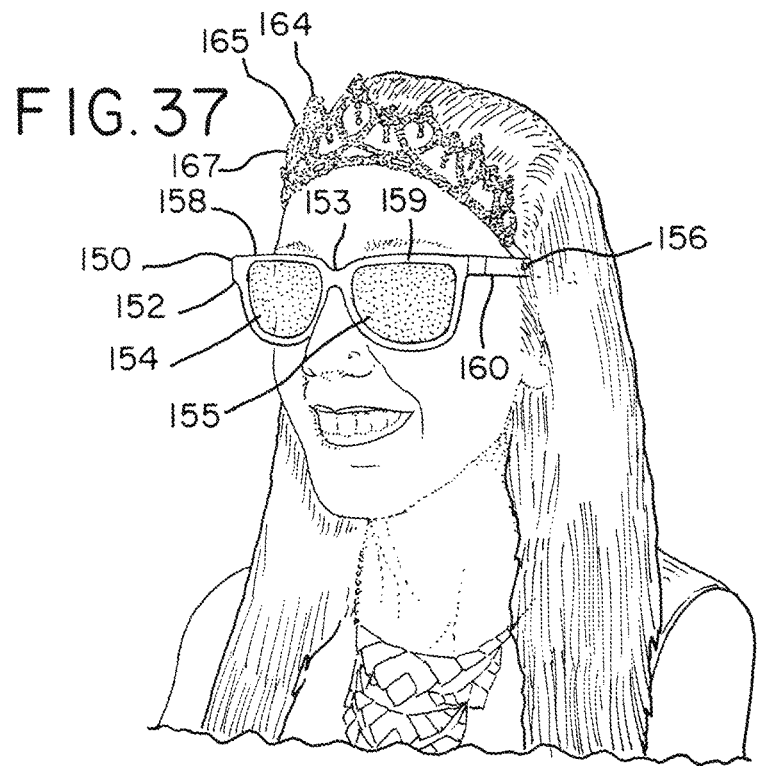
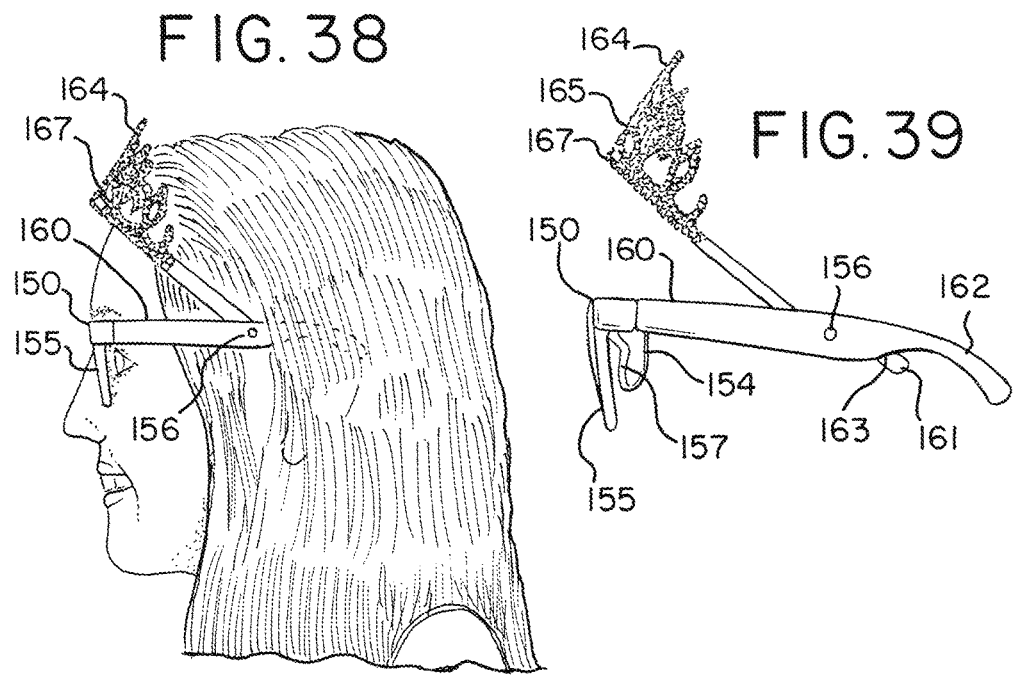

NOVELTY SHADES

CROSS REFERENCE TO RELATED APPLICATIONS

This application is a continuation in part of U.S. patent application Ser. No. 12/954,315 filed Nov. 24, 2010.

BACKGROUND OF THE INVENTION

This invention relates to eyeglasses, and more particularly, to novelty eyeglasses.

Over the years various designer eyeglasses, fashion eyewear, sunglasses and novelty shades have been marketed, advertised and manufactured. Many prior designer eyeglasses, fashion eyewear, sunglasses and novelty shades have been popular, entertaining and fun. Some designer eyeglasses, fashion eyewear, sunglasses and novelty shades have been useful with costumes, such as at Halloween. Such designer eyeglasses, fashion eyewear, sunglasses and novelty shades have met with varying degrees of success. Many prior designer eyeglasses, fashion eyewear, sunglasses and novelty shades are expensive, flimsy, readily break, and/or difficult to manufacture.

It is, therefore, desirable to provide an improved eyeglasses and novelty shades, which overcomes most, if not all of the preceding problems.

BRIEF SUMMARY OF THE INVENTION

Improved eyeglasses and novelty shades are provided that are fashionable, entertaining and fun. The improved eyeglasses and novelty shades can be worn at sporting events, pep rallies, amusement parks, popular concerts, car races, parties, and with costumes, such as at Halloween or Marti Gras. Advantageously, the improved eyeglasses are comfortable safe, portable, light weight, and easily transportable. Desirably, the improved eyeglasses and novelty shades are economical, attractive and fun. Furthermore, the user friendly eyeglasses and novelty shades are simple to use, easy to manufacture, and effective.

Significantly, the improved eyeglass assembly comprises a novelty operatively connected to an eyeglass frame. Desirably, the novelty comprises a headband or a part of at least one imitation vehicle.

The eyeglass assembly can include an eyeglass frame with rims and a bridge extending between and securely connecting the rims and for positioning the eyeglass frame on a nose of a person. The eyeglass frame can have elongated temples connected to the rims. The elongated temples can have earpieces for positioning the eyeglass frame on the person's ears. The eyeglass frame can be of a size and shape so that the eyeglasses can be worn by a child or adult. The eyeglasses can comprise: sunglasses, novelty sunglasses, fanciful shades, three dimensional (3D) glasses, eyewear, fashion eyeglasses, designer sunglasses, or specialty eyeglasses.

Preferably, at least part of the novelty is positioned at an elevation above an ear of the person when the person is wearing the eyeglasses. The improved eyeglasses can also have at least one upward appendage connected to one of the elongated temples of the eyeglass frame. The novelty can be connected to the upward appendage and can extend at an elevation above the temples.

The headband can comprise a unitary one-piece headband or an interlocking multiple piece headband. The headband can further comprises a decorative portion, such as an imitation crown, an imitation tiara, an imitation coronet, or an imitation wreath.

The vehicle can comprise an attractive imitation vehicle, such as a: car, race car, police car, station wagon, van, recreational vehicle, truck, tow truck, fire truck, bulldozer, excavator, dump truck, backhoe, garbage truck, snow mobile, off track vehicle, road vehicle, tank, construction vehicle, crane, bus, boat, jet ski, train, steam engine, train engine, and caboose.

Preferably, the vehicle has a wheel well conforming and positioned in proximity to one of the earpieces of the eyeglass frame.

The eyeglasses can also have an image, such a located: on the inside of the eyeglass assembly, the outside of the eyeglass assembly, an inwardly facing surface of a lens, an outwardly facing surface of the lens, an inwardly facing surface of the eyeglass frame, or an outwardly facing surface of the eyeglass frame, The image can comprise: a logo, indicia, symbol, design, trademark, service mark, brand name, company name, black indicia, white indicia, colored indicia, characters, letters, words, numbers, graphics, flag, hologram, laser etched image, embossed image, imprinted image, stamped image, screen printed image, printed image, anodized image, etched image, lithograph image, decal image, engraved image, or combinations of any of the preceding.

In one form, the appendage comprises an upward appendage for extending upwardly from the frame when the person is wearing the eyeglasses. The appendage can have a base portion connected to the frame and an outer portion connected to the base portion for engaging and supporting the novelty.

The novelty can comprise: a novelty item, appendage-engaging member, accessory, decoration, adornment, ornament, attachment, or combinations thereof. The novelty can have a pocket or tube for receiving and engaging the appendage.

In one form, the eyeglasses comprise an eyeglass assembly including: lenses; a frame holding the lenses and having temples with ear pieces that fit upon the ears of a user when the eyeglasses are being worn by the user; upward appendages connected to and extending upwardly from the temples; and novelty items connected to the appendages. The novelty item can comprise imitation parts of an animal, mammal, human being, bird, fish, insect, avatar, or cartoon character. At least part of the novelty item can extend outwardly and upwardly from the appendages when the eyeglasses are being worn by the user. The eyeglass assembly can have a logo or other image.

The novelty items can comprise interchangeable novelty items and can be spaced above the temples. The imitation parts can comprise: ears, antlers, horns, fins, tails, heads, hands, feet, talon, claws, or wings.

A more detailed explanation of the invention is provided in the following detailed descriptions and appended claims taken in conjunction with the accompanying drawings.

BRIEF DESCRIPTION OF THE DRAWINGS

FIG. 1 is a front view of improved eyeglasses and novelty shades with novelty items comprising animal ears in accordance with principles of the present invention.

FIG. 2 is a partial side perspective view of improved eyeglasses and novelty shades with novelty items comprising animal ears in accordance with principles of the present invention.

FIG. 3 is a front view of improved eyeglasses and novelty shades with a supplemental novelty item (supplemental part) comprising a bird beak in accordance with principles of the present invention.

FIG. 4 is front view of improved eyeglasses and novelty shades with novelty items comprising bear ears on a person (user or wearer) in accordance with principles of the present invention.

FIG. 5 is side perspective view of improved eyeglasses and novelty shades with novelty items comprising bird wings in accordance with principles of the present invention.

FIG. 37 is a front perspective view of improved eyeglasses and novelty shades with a novelty item comprising a tiara in accordance with principles of the present invention.

FIG. 38 is a side perspective view of the improved eyeglasses and novelty shades with the novelty item comprising the tiara of FIG. 37.

FIG. 39 is a side view of the improved eyeglasses and novelty shades with the novelty item comprising the tiara of FIG. 37.

DETAILED DESCRIPTION OF THE INVENTION

Figure 6:
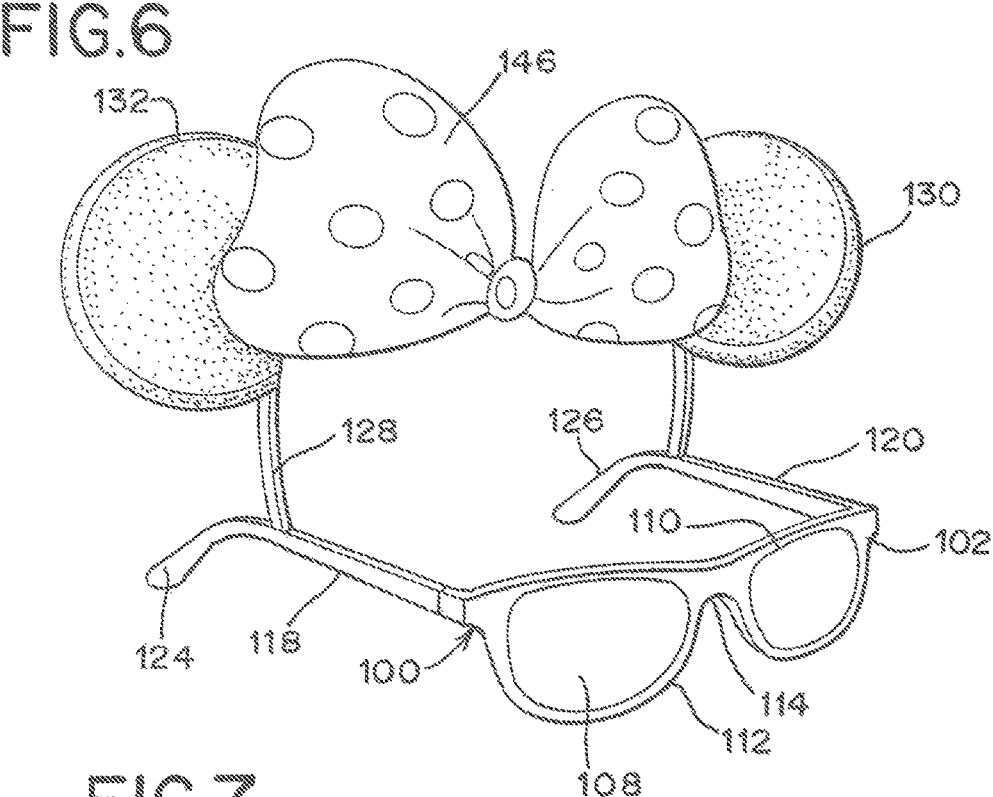
FIG. 6 is left side perspective view of improved eyeglasses and novelty shades with novelty items comprising bear ears in accordance with principles of the present invention.
Figure 7:
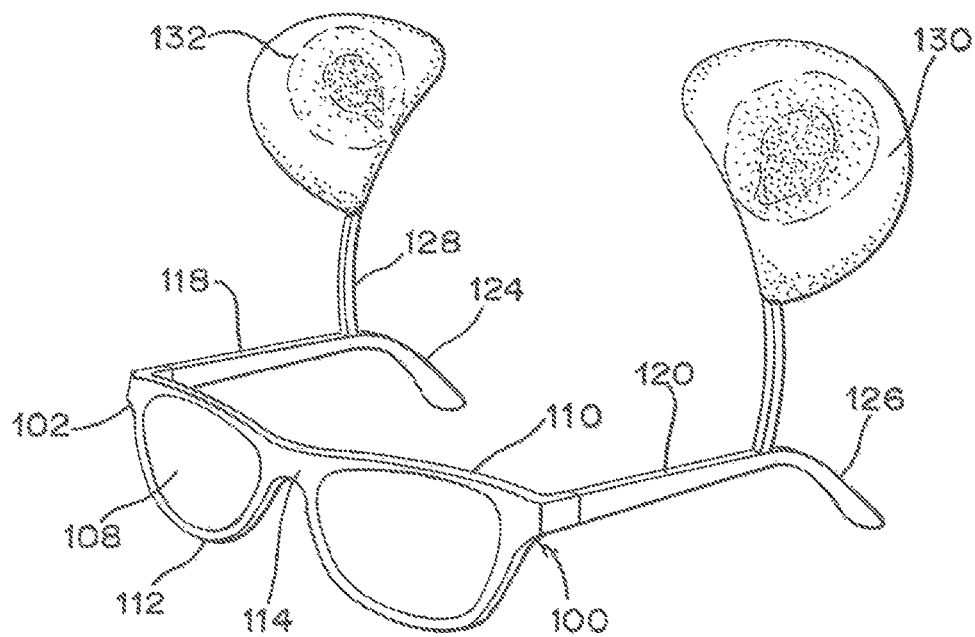
FIG. 7 is right side perspective view of improved eyeglasses and novelty shades with novelty items comprising mouse ears and a supplemental novelty item (supplemental part) comprising a bowtie connecting the mouse ears in accordance with principles of the present invention.
Figure 8:
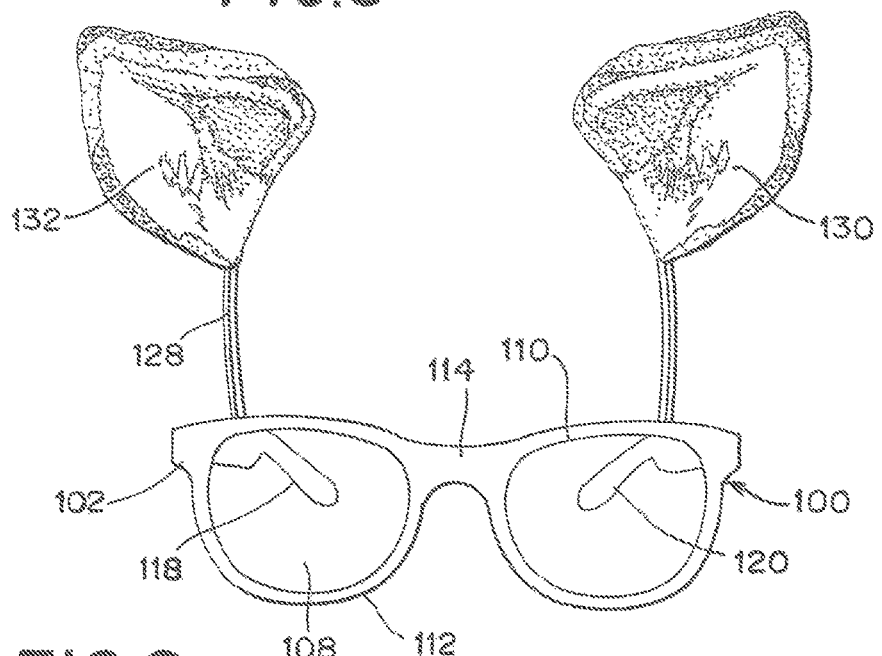
FIG. 8 is front view of improved eyeglasses and novelty shades with novelty items comprising tiger ears in accordance with principles of the present invention.
Figure 9:
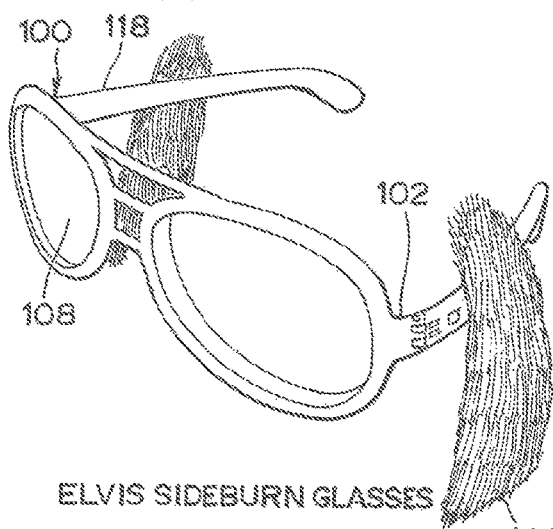
FIG. 9 is left side perspective view of other improved eyeglasses and novelty shades with novelty items or supplemental parts comprising sideburns in accordance with principles of the present invention.

The following is a detailed description and explanation of the preferred embodiments of the invention and best modes for practicing the invention.

Figure 12:
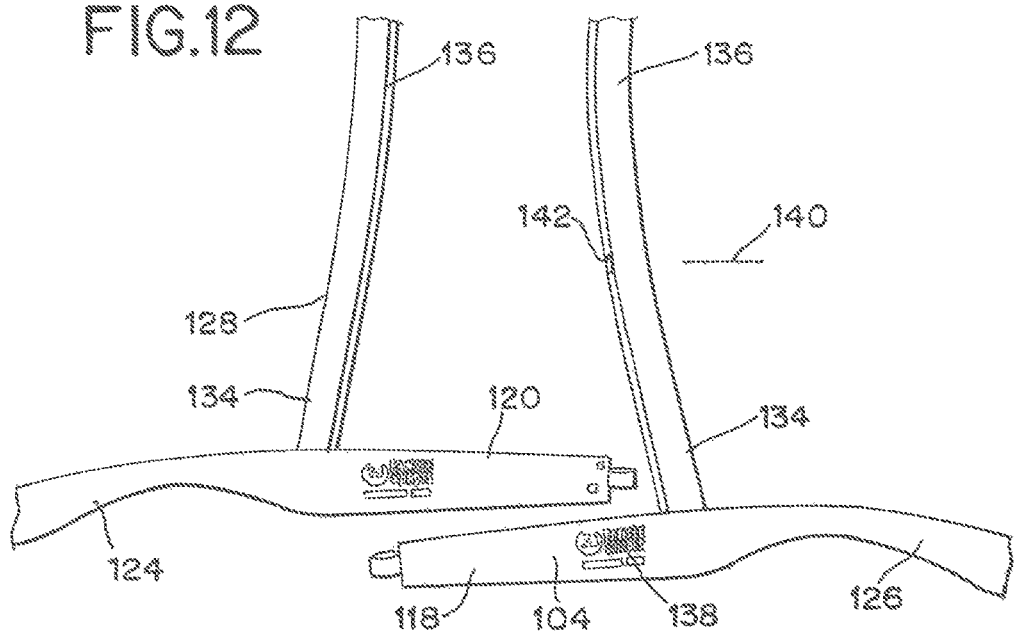
FIG. 12 is an enlarged view of parts of the appendages and temples with ear pieces of improved eyeglasses and novelty shades in accordance with principles of the present invention.
Figure 13:
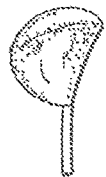
FIG. 13 is a reduced front view of improved eyeglasses and novelty shades with novelty items comprising monkey ears in accordance with principles of the present invention.
Figure 14:
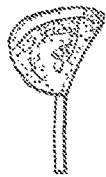
FIG. 14 is a reduced front view of improved eyeglasses and novelty shades with novelty items comprising gorilla ears in accordance with principles of the present invention.
Figure 15:
FIG. 15 is a reduced front view of improved eyeglasses and novelty shades with novelty items comprising giraffe ears in accordance with principles of the present invention.
Figure 16:
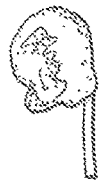
FIG. 16 is a reduced front view of improved eyeglasses and novelty shades with novelty items comprising lion ears in accordance with principles of the present invention.
Figure 17:
FIG. 17 is a reduced front view of improved eyeglasses and novelty shades with novelty items comprising tiger ears in accordance with principles of the present invention.
Figure 18:
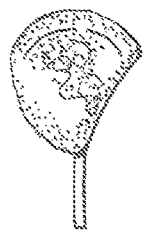
FIG. 18 is a reduced front view of improved eyeglasses and novelty shades with novelty items comprising bear, cub or panda ears in accordance with principles of the present invention.
Figure 19:
FIG. 19 is a reduced front view of improved eyeglasses and novelty shades with novelty items comprising wolf ears in accordance with principles of the present invention.
Figure 20:
FIG. 20 is a reduced front view of improved eyeglasses and novelty shades with novelty items comprising dog ears in accordance with principles of the present invention.
Figure 21:
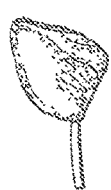
FIG. 21 is a reduced front view of improved eyeglasses and novelty shades with novelty items comprising cat ears in accordance with principles of the present invention.
Figure 22:
FIG. 22 is a reduced front view of improved eyeglasses and novelty shades with novelty items comprising elephant ears in accordance with principles of the present invention.
Figure 23:
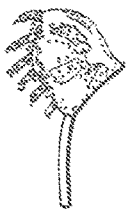
FIG. 23 is a reduced front view of improved eyeglasses and novelty shades with novelty items comprising hippopotamus ears in accordance with principles of the present invention.
Figure 24:
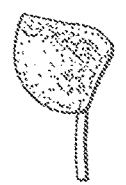
FIG. 24 is a reduced front view of improved eyeglasses and novelty shades with novelty items comprising panther ears in accordance with principles of the present invention.
Figure 25:
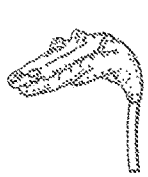
FIG. 25 is a reduced front view of improved eyeglasses and novelty shades with novelty items comprising alligator or crocodile heads in accordance with principles of the present invention.
Figure 26:
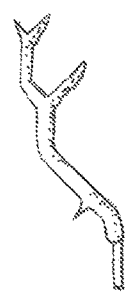
FIG. 26 is a reduced front view of improved eyeglasses and novelty shades with novelty items comprising buck ears in accordance with principles of the present invention.
Figure 27:
FIG. 27 is a reduced front view of improved eyeglasses and novelty shades with novelty items comprising bull ears in accordance with principles of the present invention.
Figure 28:
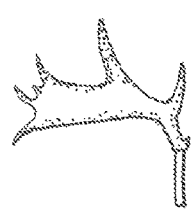
FIG. 28 is a reduced front view of improved eyeglasses and novelty shades with novelty items comprising moose ears in accordance with principles of the present invention.
Figure 29:
FIG. 29 is a reduced front view of improved eyeglasses and novelty shades with novelty items comprising horse ears in accordance with principles of the present invention.
Figure 30:
FIG. 30 is a reduced front view of improved eyeglasses and novelty shades with novelty items comprising rabbit or bunny ears in accordance with principles of the present invention.
Figure 31:
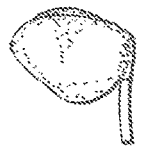
FIG. 31 is a reduced front view of improved eyeglasses and novelty shades with novelty items comprising cow ears in accordance with principles of the present invention.
Figure 32:
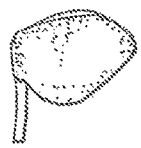
FIG. 32 is a reduced front view of other improved eyeglasses and novelty shades with novelty items comprising mouse ears in accordance with principles of the present invention.
Figure 33:
FIG. 33 is a reduced front view of improved eyeglasses and novelty shades with novelty items comprising kangaroo ears in accordance with principles of the present invention.
Figure 34:
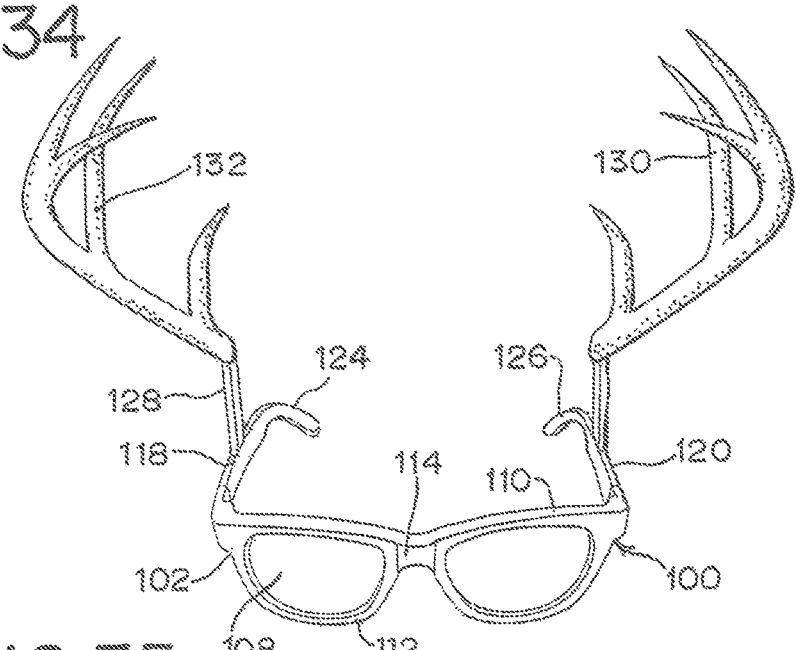
FIG. 34 is a front perspective view of improved eyeglasses and novelty shades with novelty items comprising antlers of a buck in accordance with principles of the present invention.
Figure 35:
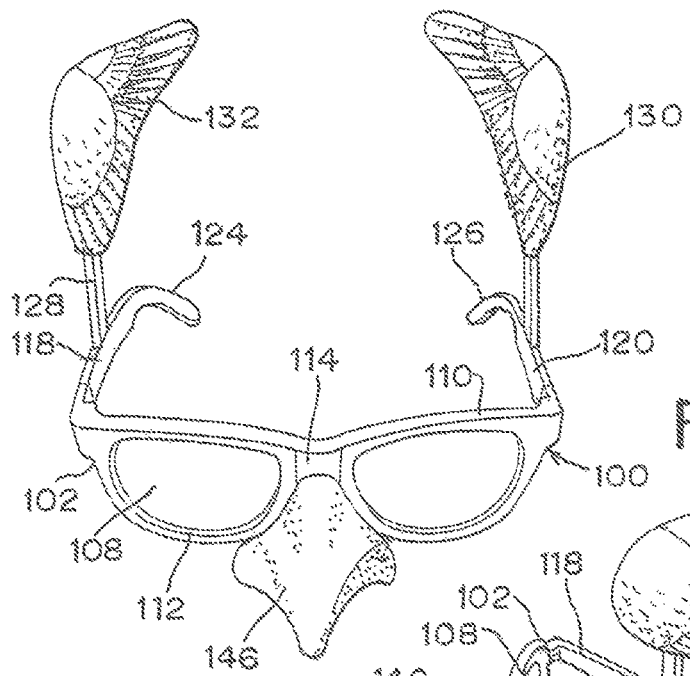
FIG. 35 is a front perspective view of improved eyeglasses and novelty shades with novelty items comprising bird wings of a cardinal and a supplemental novelty item (supplemental part) comprising a bird beak of a cardinal in accordance with principles of the present invention.
Figure 36:
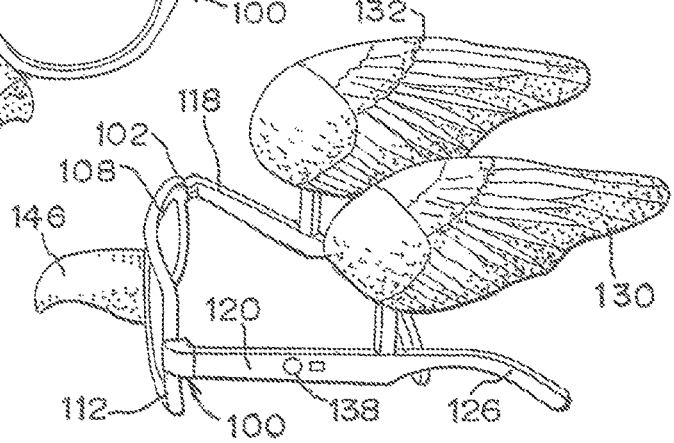
FIG. 36 is a side perspective view of the improved eyeglasses and novelty shades of FIG. 35 with novelty items comprising bird wings of a cardinal and a supplemental novelty item (supplemental part) comprising a bird beak of a cardinal in accordance with principles of the present invention.
Figure 40:
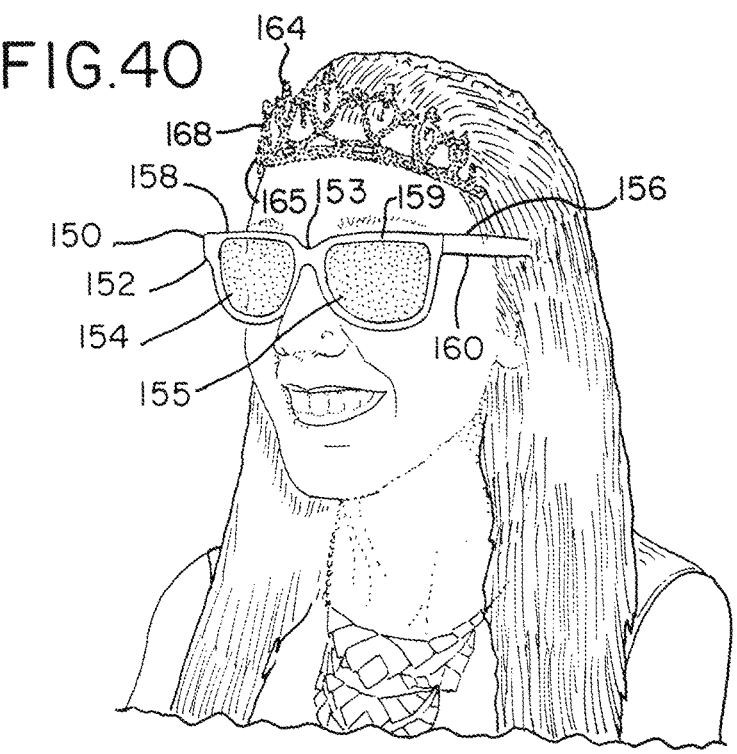
FIG. 40 is a front perspective view of improved eyeglasses and novelty shades with a novelty item comprising a coronet or another tiara in accordance with principles of the present invention.
Figure 41:
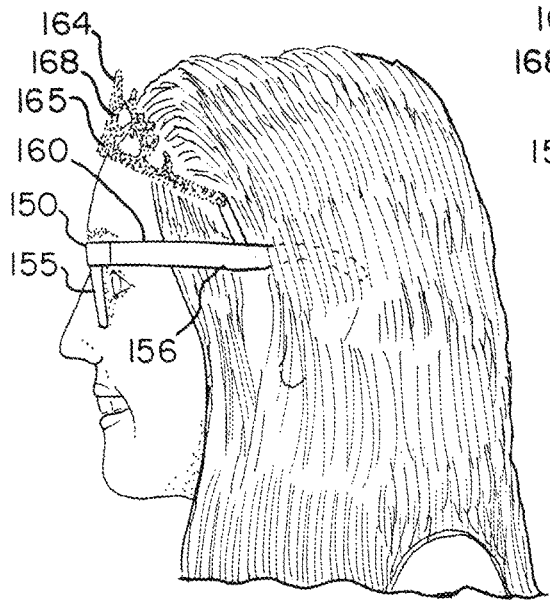
FIG. 41 is a side perspective view of the improved eyeglasses and novelty shades with the novelty item comprising the coronet or tiara of FIG. 40.

As shown in the drawings, eyeglasses 100 can be provided that comprises: novelty sunglasses, fanciful shades, novelty shades, three dimensional (3D) glasses, eyewear, fashion eyeglasses, designer sunglasses, and/or specialty eyeglasses. The eyeglasses can have an eyeglass assembly 102 with an inside 104 comprising inwardly facing surfaces and an outside 106 comprising outwardly facing surfaces. The eyeglass assembly can include a pair of lenses 108 for positioning in front of a person's eyes and an eyeglass frame 110 having a rim 112 for holding and securing the lenses A bridge 114 can extend between and connect the rim. Nose pads 116 can be connected to the rims for resting upon and positioning the frame on the person's nose. A pair of elongated temples 118 and 120 can be pivotally hinged by a hinge 122 (FIGS. 2 and 5) and connected to the rim. The temples can have earpieces 124 and 126 that fit upon the person's ears. The temples can be moveable from a collapsed storage position against the inward facing surfaces of the rims to an open expanded position when the person is wearing the eyeglasses;

The attractive eyeglasses can have a pair of substantially symmetrical upward appendages 128 that are securely connected to and extend upwardly from the temples of the frame. Advantageously, a pair of appendage-engaging novelty items 130 can be connected to the appendages and can be spaced above the temples. The appendage-engaging novelty items can comprise imitation parts 132 of an animal, mammal, human being, bird, fish, insect, avatar or cartoon character. At least part of the novelty items can overhang and extend outwardly and upwardly from the appendages when the eyeglasses are being worn by the person. Preferably, the appendages can having temple-engaging lower base portions 134 (FIG. 12) that are securely connected to and extend upwardly from the temples and can have an outer upper support portions 136 that are securely connected and extend upwardly from the lower base portion to support and receive the novelty items.

The lenses can comprise optical lenses, such as: plastic lenses, glass lenses, tinted lenses, transparent lenses, polarized lenses, photo chromic lenses, sunglass lenses, slit lenses, yellow lenses, amber lenses, grey lenses, brown lenses, black lenses, red lenses, pink lenses, blue lenses, lenses with hues of any of the preceding colors, three-dimensional (3D) lenses, or a combination of any of the preceding.

The frames can comprise: plastic frames, wire frames, metal frames, wooden frames, composite frames, white frames, black frames, colored frames, yellow frames, orange frames, gold frames, brown frames, grey frames, blue frames, pink frames, red frames, frames with hues of any of the preceding colors, rigid frames, semi-rigid frames, flexible frames, resilient frames, or combinations of any of the preceding.

The appendages can comprise: flexible appendages resilient appendages, bendable appendages, elongated appendages, rigid appendages, semi-rigid appendages, complementary appendages, cantilevered appendages, curved appendages, arched appendages, plastic appendages, molded appendages, wire appendages, coiled spring appendages, helical spring appendages, metal appendages, wooden appendages, composite appendages, white appendages, black appendages, colored appendages, yellow appendages, orange appendages, gold appendages, brown appendages, grey appendages, blue appendages, pink appendages, red appendages, appendages with hues of any of the preceding colors, rubber appendages, elastomeric appendages, or combinations of any of the preceding.

The lower base portion of the appendages can comprise: pedestal, stems, bases, threaded base portions, mitered base portions, straight base portions, curved base portions, flat base portions, rounded base portions, rectangular cross-sectional base portions, or combinations of any of the preceding.

The upper support portions of the appendages can be spaced at an elevation above the temples. The upper support portions of the appendages can comprise: curved support portions, arched support portions, converging support portions, diverging support portions, flexible support portions, resilient support portions, symmetrical support portions, complementary support portions, bendable support portions, rigid support portions, semi-rigid support portions, elastomeric support portions, or combinations of any of the preceding.

The novelty items can comprise: plush novelty items, stuffed novelty items, fur novelty items, faux fur novelty items, hairy novelty items, foam novelty items, rubber novelty items, elastomeric novelty items, resilient novelty items, foam novelty items, textile novelty items, cloth novelty items, wool novelty items, plastic novelty items, composite novelty items, wooden novelty items, metal novelty items, metallic foil novelty items, sponge novelty items, inflatable novelty items, detachable novelty items, interchangeable novelty items, symmetrical novelty items, complementary novelty items, water-resistant novelty items, flame-retardant novelty items, or combinations of any of the preceding.

The eyeglass assembly can have at least one image 138 (FIG. 12) on the inside or outside of the eyeglass assembly, the inwardly or outwardly facing surface of a lens, the inwardly or outwardly facing surface of the eyeglass frame, and/or the inwardly or outwardly facing surface of the appendage. The image can comprise: a logo, indicia, symbol, design, trademark, service mark, brand name, company name, black indicia, white indicia, colored indicia, characters, letters, words, text, numbers, alpha numeric image, graphics, flag, hologram, laser etched image, embossed image, imprinted image, stamped image, screen printed image, printed image, anodized image, etched image, lithograph image, decal image, engraved image, and combinations of any of the preceding.

The specialty eyeglasses can have connectors 140 (FIG. 12) to connect the appendages to the novelty items. The connectors can include: thread, yarn, rope, string, wire, and/or pins. The support portions of the appendages can define passageways 142 which extend through the support portions to receive part of the connectors. The passageways can comprise: holes, openings, and/or apertures. At least part of the connectors can pass through the passageways.

Figure 10:
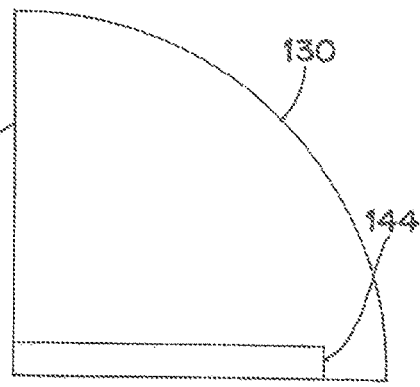
FIG. 10 is a cross-sectional view of a novelty item comprising a plush ear with a tube or hole to receive an appendage of improved eyeglasses and novelty shades in accordance with principles of the present invention.
Figure 11:
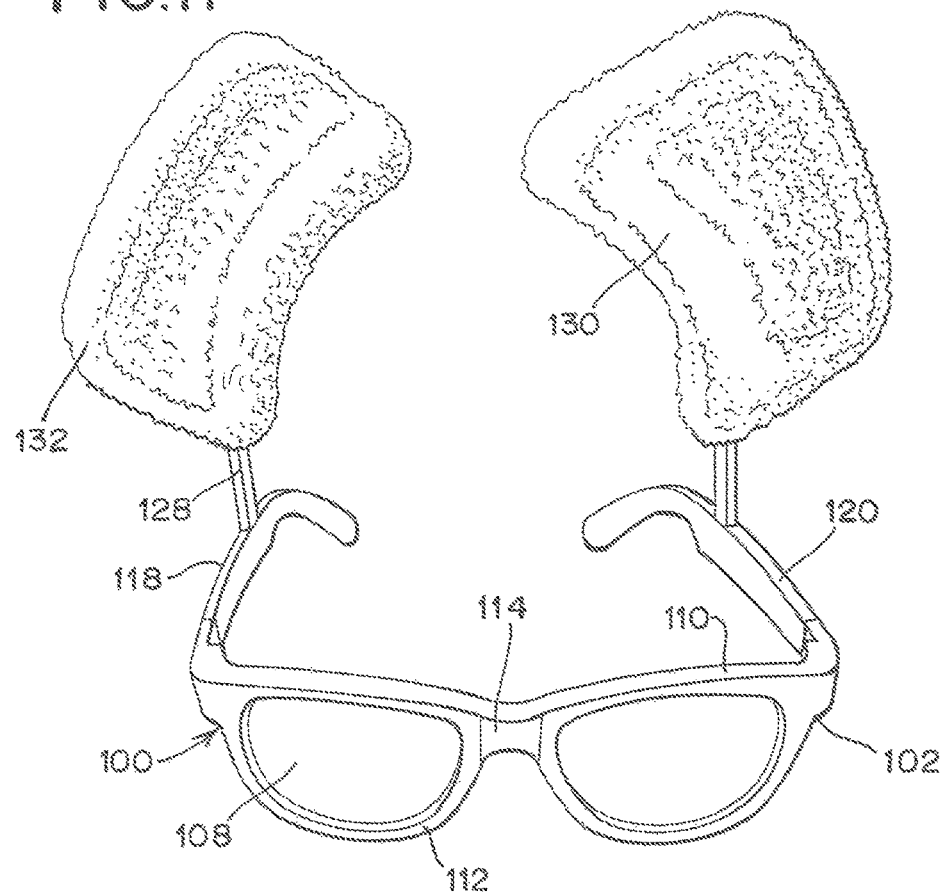
FIG. 11 is front view of improved eyeglasses and novelty shades with novelty items comprising faux fur ears or plush ears in accordance with principles of the present invention.

The novelty items can comprise support portion-engagers 144 (FIG. 10) to engage and snugly receive the support portions of the appendages. The support-portion engagers can be a tube, socket, and/or pocket.

The imitation parts can be: interchangeable imitation parts, imitation animal parts, imitation mammals parts, imitation human parts, imitation bird parts, imitation fish parts, imitation insect parts, avatar parts, cartoon character parts, imitation ears, imitation antlers, imitation horns, imitation fins, imitation tails, imitation heads, imitation hands, imitation feet, imitation claws, imitation monkey ears, imitation giraffe ears, imitation lion ears, imitation tiger ears, imitation badger ears, imitation bear ears, imitation cub cars, imitation panda ears, imitation wolf ears, imitation dog ears, imitation cat ears, imitation elephant ears, imitation hippopotamus ears, imitation panther ears, imitation alligator heads, imitation crocodile heads, imitation buck antlers, imitation bull horns, imitation cow horns, imitation moose antlers, imitation horse ears, imitation rabbit ears, imitation bunny ears, imitation mouse ears, imitation kangaroo ears, imitation angel wings, imitation bird wings, or combinations of any of the preceding.

The novel eyeglasses can include at least one supplemental part 146 (FIGS. 3, 9, 35 and 36), such as a: frame engaging imitation part connected to the frame, a novelty item-engaging part connected to the novelty item, imitation animal part, imitation bird part, imitation fish part, imitation mammal part, imitation horse mane, imitation bird beak, imitation bird bill, imitation tusk, imitation nose, imitation sideburns, imitation beard, imitation feet, imitation hoofs, imitation claws, imitation bowtie, imitation talons, imitation tail, imitation fin, and/or combinations of any of the preceding.

The invention is directed to novelty items that can fit upon or be securely or removably connected to the appendages. The novelty items, such as imitation fur ears, can be anchored to the appendage in two ways. First, there can be a tube within the fur ear that the appendage slides into. Second the appendage itself can have two holes that are used to sew the ear to the appendage to anchor the ear after the appendage is slipped into the inner tube. From the outside view, because of the fur, one can't clearly see how the ears are attached to the sunglasses.

Six molds of different appendages can be used. However, more or less molds can also be used.

As examples, imitation parts of animals are described hereinafter for the novelty items and the appendages.

1. Tiger and bear: the appendage can start at the temple side piece and arcs to within two and a half inches from each other. The tiger, bear, etc ears can face forward and appear toward the top of the arc so that they sit on top of a person's head.
2. Huskie or house: the appendage can only go up from the temple two-thirds the way and does not allow the ears to set on top of the head. The ears can sit somewhat on the side of the head like a huskie dog or horse.
3. Wing, bull horn or cow horn: this appendage comes out of the temple and can only go up about three inches where a wing or bull/cow horn would attach.
4. Combo badger or wolverine: this can include the full appendage of the tiger where the badger ears sit on top of the head but a lower appendage can be added that comes out directly below the upper appendage such at a 45 degree angle below the upper appendage such at a 45 degree angle toward the face matching the human jaw line. The fur can be slipped so that the person wearing the sunglasses would have ears on top, fur down the appendage and fur on the lower appendage looking like a badger or wolverine depending on the fur make up.
5. Talons on lower appendage only. On the lower part anything could be attached, e.g. sideburns, bird feet, such as the Atlanta Falcons feet part of their logo, lions, mane beard, etc.
6. Horse mane or shark fin: at the end of the tiger appendage on the top and only one side, a three fingered comb can be applied. This would be used as a platform for anything that would be needed in between the ears such as a horse mane. This can be used for the colts of the broncos. Facing the sunglasses, the left appendage can be the huskie appendage but the right would be the tiger appendage with the three fingered comb attached to the end of the appendage. On the right appendage, there can be no fur between the horse ear and the mane which would be anchored to the flat fingered comb. When the person has the sunglasses on, it can look like they had two horse ears and a mane out of the top of their head. The spread out fingers allow a platform for a mane to sit and rest backward on the head of the wearer. The same could be done with fins and a dorsal fin for all types of fish.

7. Plush imitation animal ears can be placed on the appendages of the sunglasses but the ears can be made of foam or any material. Foam can be used for Tinkerbelle elf ears. Elf ears are basically the wing design except the elf ears have a long back so that any child's ear could slip between the front and back space and look like an elf without having to fit the ear size.

Figure 45:
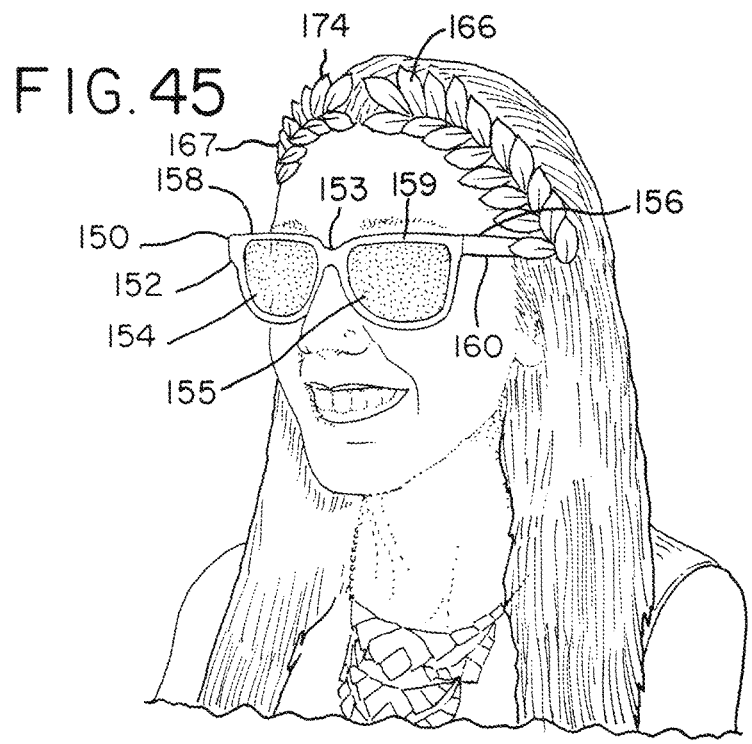
FIG. 45 is a front perspective view of improved eyeglasses and novelty shades with a novelty item comprising a wreath in accordance with principles of the present invention.
Figure 47:
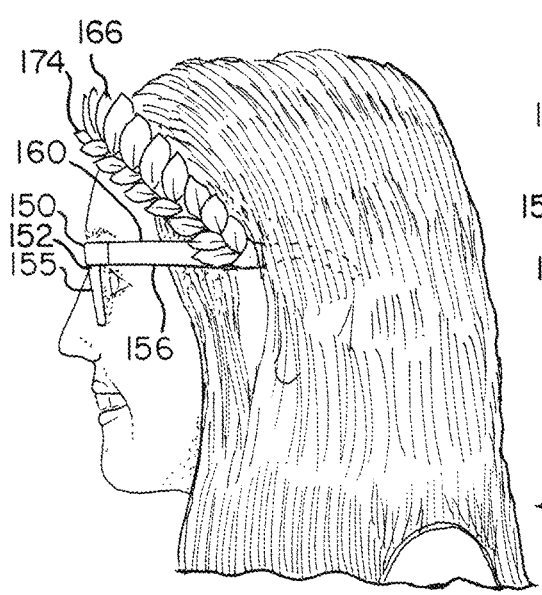
FIG. 47 is a side perspective view of the improved eyeglasses and novelty shades with the novelty item comprising the wreath of FIG. 45.
Figure 46:
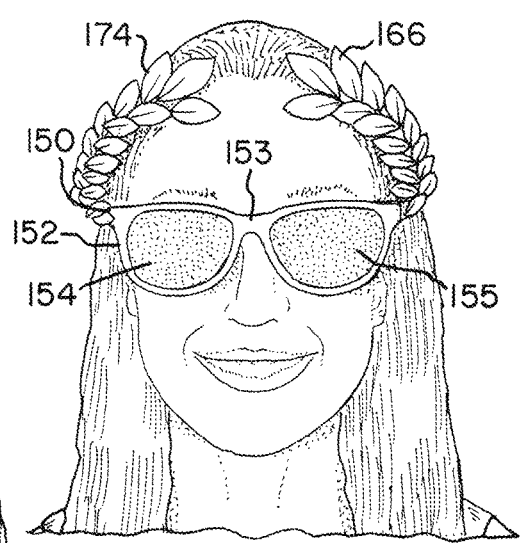
FIG. 46 is a front view of the improved eyeglasses and novelty shades with the novelty item comprising the wreath of FIG. 45.
Figure 48:
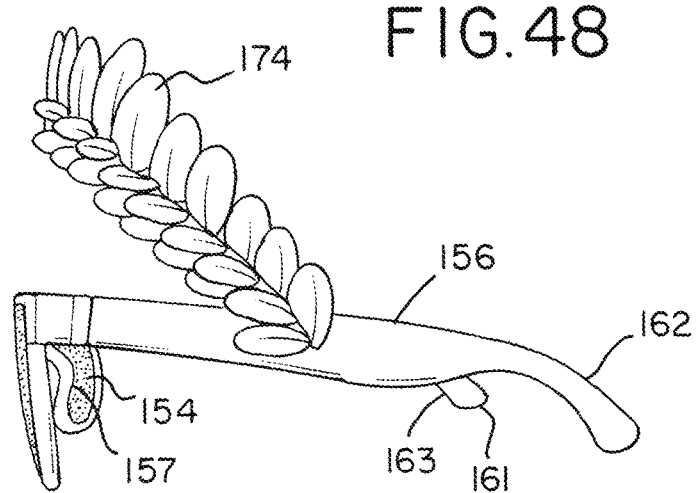
FIG. 48 is a side view of the improved eyeglasses and novelty shades with the novelty item comprising the wreath of FIG. 45.
Figure 49:
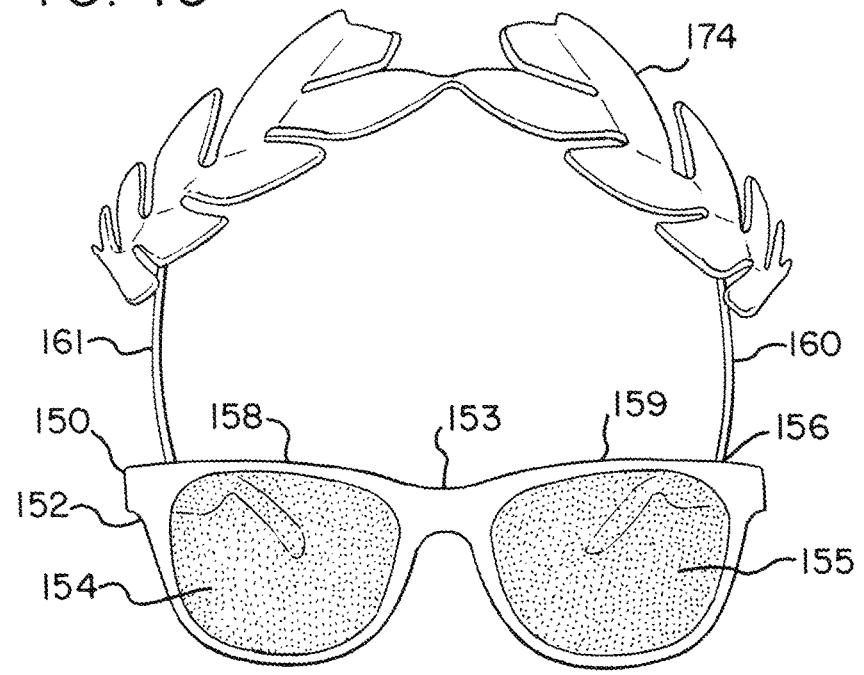
FIG. 49 is a front view of improved eyeglasses and novelty shades with a novelty item comprising a victory wreath in accordance with principles of the present invention.
Figure 50:
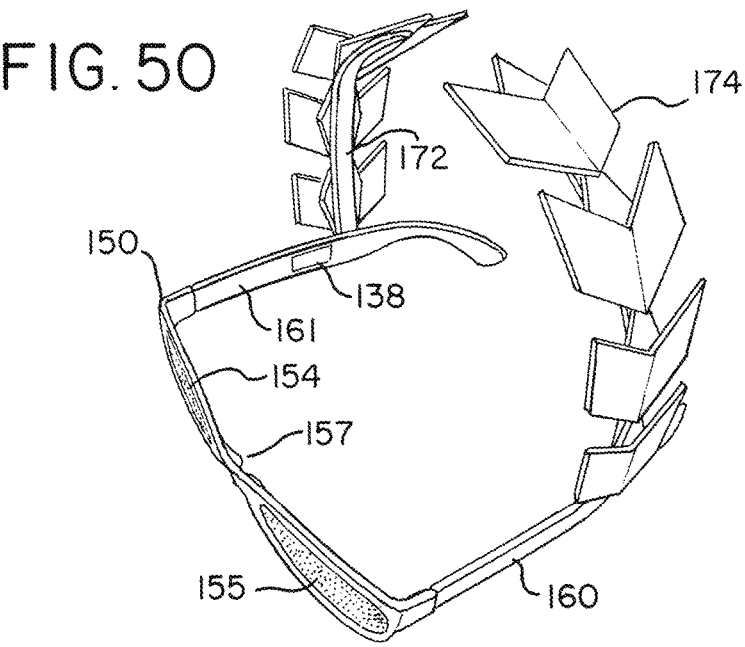
FIG. 50 is a top perspective view of improved eyeglasses and novelty shades with a novelty item comprising another wreath, such as an Olympic wreath, Roman wreath or Caesar wreath, in accordance with principles of the present invention.
Figure 51:
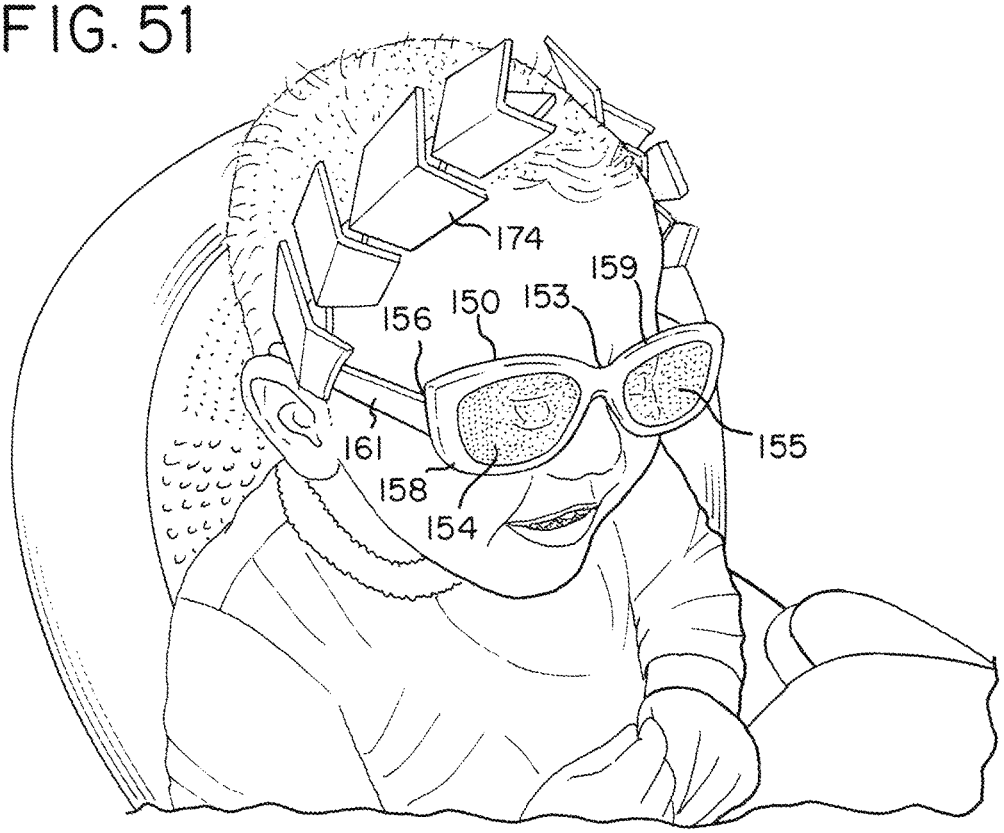
FIG. 51 is a side perspective view of improved eyeglasses and novelty shades with a novelty item comprising a Greek wreath in accordance with principles of the present invention.

The eyeglasses 150 of FIGS. 37-51 can comprise an eyeglass assembly 152 with optional lenses 154-155 and an eyeglass frame 156 with rims 159-159 for holding the lenses and elongated temples 160-161 having ear pieces 162-163 that fit upon the ears of a user when the eyeglasses are being worn by the user. A bridge 153 can extend between and connect the rims. Nose pads 157 (FIGS. 39, 42, 48, and 50) can be connected to the rims for resting upon and positioning the frame on the user's nose. Advantageously, a headband 164 is securely connected to the eyeglass frame. The headband can comprise a unitary one-piece headband 165 (FIG. 37) or an interlocking multiple piece headband 166 (FIG. 45).

In FIGS. 37-44, the headband comprises a gold colored headband, a platinum colored headband, or a silver colored headband. The headband of FIGS. 37-42 comprises a tiara headband 167 or a coronet headband 168. The headband of FIGS. 43 and 44 comprises a crown headband 170. Other shaped crowns, tiaras, and coronets can be used.

Figure 42:
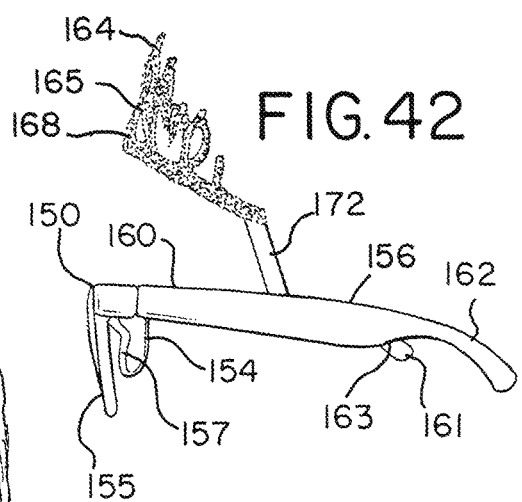
FIG. 42 is a side view of the improved eyeglasses and novelty shades with an upward appendage connected to the novelty item comprising the coronet or tiara of FIG. 40.
Figure 43:
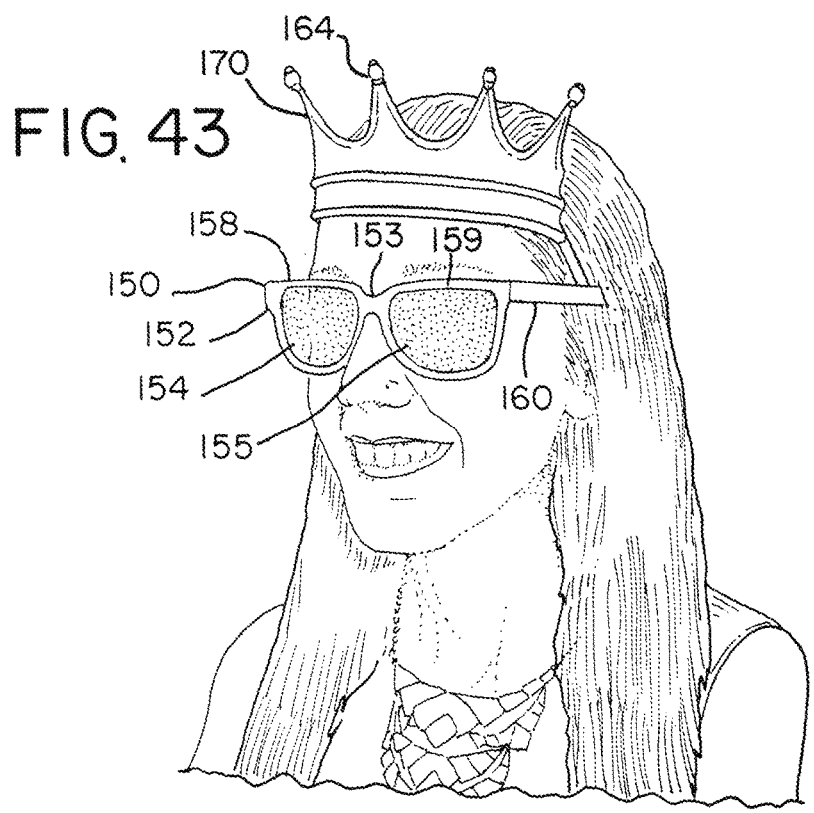
FIG. 43 is a front perspective view of improved eyeglasses and novelty shades with a novelty item comprising a crown in accordance with principles of the present invention.
Figure 44:
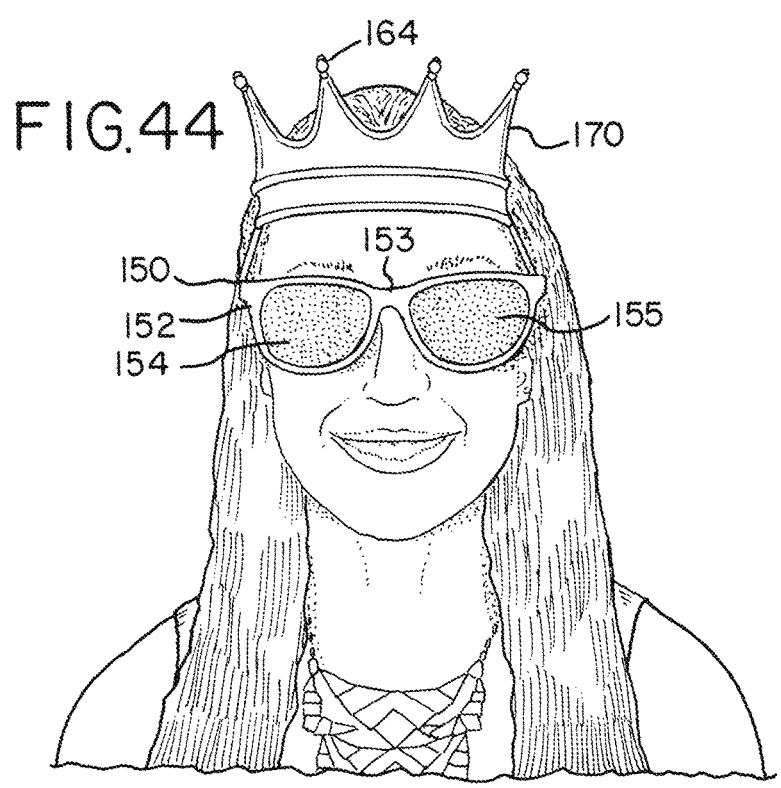
FIG. 44 is a front view of the improved eyeglasses and novelty shades with the novelty item comprising the crown of FIG. 43.

As best shown in FIG. 42, the eyeglasses, can have substantially symmetrical upward appendages 172 connected to the elongated temples of the eyeglass frame. The appendages preferably extend upwardly and forwardly or rearwardly at an angle of inclination. The headband, such as a wreath headband 174 or tiara headband can be pivotally and securely connected to the upward appendages and extend forwardly at an elevation above the temples so that the front part of the headband is positioned diagonally across the forehead.

In FIGS. 45-51, the headband comprises a wreath headband 174 comprising an imitation wreath, such as a Roman wreath, a Cesar wreath, a gold wreath, a platinum wreath, a Greek wreath, a green wreath, an Olympic wreath, a victory wreath, a Christmas wreath, or combinations thereof. Other shaped wreaths can be used.

Figure 52:
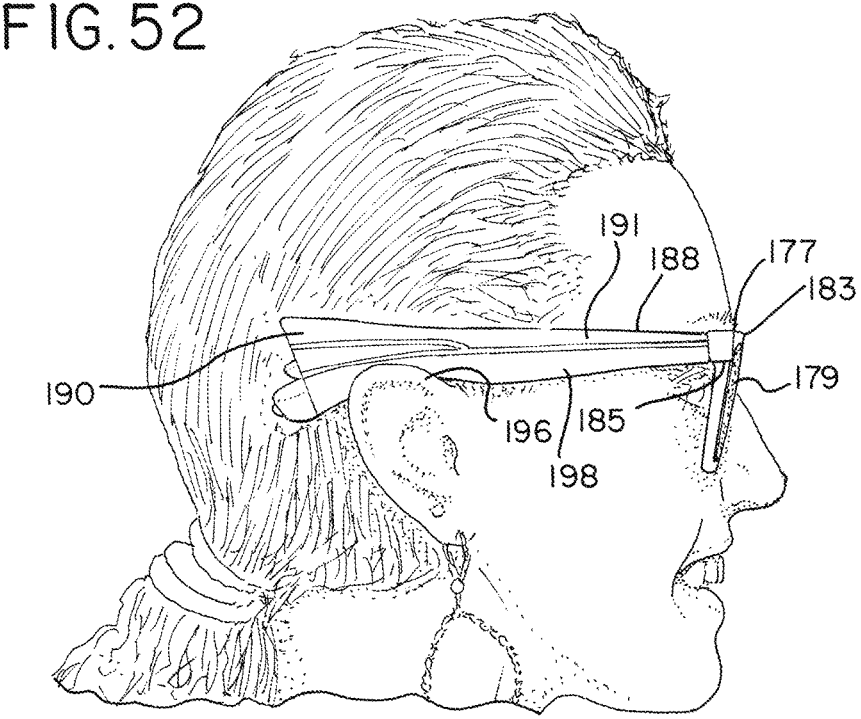
FIG. 52 is a right side view of improved eyeglasses and novelty shades with a novelty item comprising part of a vehicle in accordance with principles of the present invention.
Figure 53:
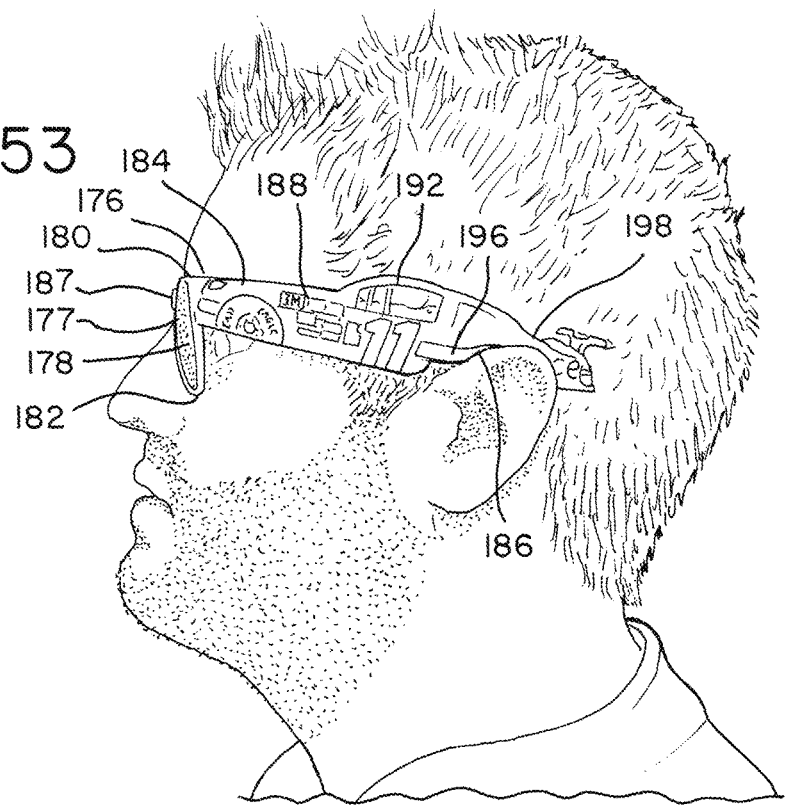
FIG. 53 is a left side view of improved eyeglasses and novelty shades with a novelty item comprising part of another vehicle in accordance with principles of the present invention.
Figure 54:
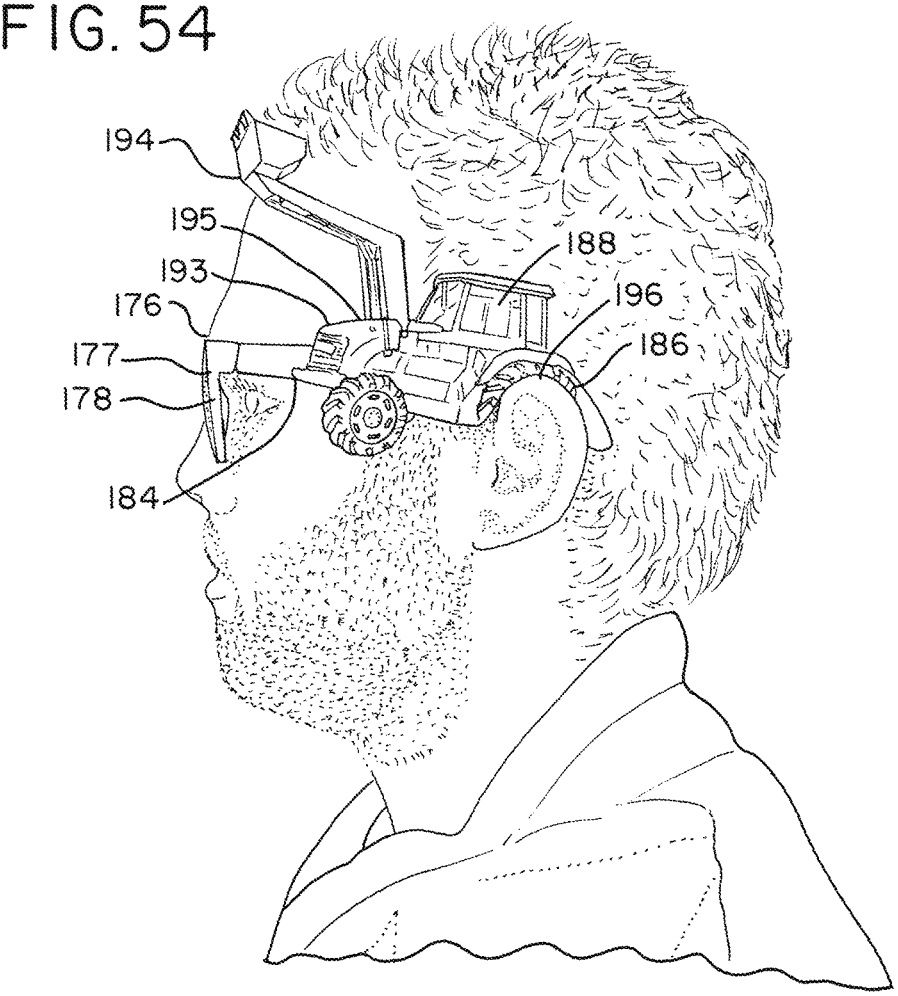
FIG. 54 is a reduced left side perspective view of improved eyeglasses and novelty shades with a novelty item comprising part of a tractor in accordance with principles of the present invention.

The eyeglasses 176 of FIGS. 52-54 can comprises an eyeglass assembly 177 with optional lenses 178-179 and an eyeglass frame 180 with rims 182-183 for holding the lenses. The eyeglass frame can have elongated temples 184-185 with symmetrical ear pieces 186 that fit upon the ears of a user when the eyeglasses are being worn by the user. Each of the ear pieces can have an angle of curvature comprising a bending radius. A bridge 187 can extend between and connect the rims. Nose pads 189 (FIG. 55) can be connected to the rims for resting upon and positioning the frame on the user's nose.

Figure 55:
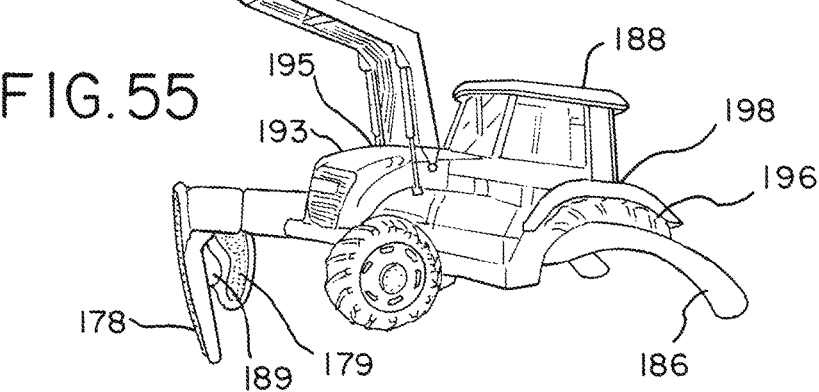
FIG. 55 is a side view of the tractor of FIG. 54.

In FIGS. 52-55 at least part of an imitation vehicle 188 is secured to the eyeglass frame. FIG. 52 illustrates a elongated fin 190 extending upwardly and rearwardly of a car 191, such as an antique car. FIG. 53 illustrates part of another car 192, such as a racing car, stock car or sports vehicle. FIGS. 54 and 55 illustrates a tractor 193 with a digger 194, such as a scoop, bucket, blade, or shovel that can be securely connected to an upward appendage 195 so that the scoop, bucket or shovel extends upwardly and forwardly of the elongated temples of the eyeglass frame.

The vehicles of FIGS. 53-55 each have one or more curved concave wheel wells 196 that conforms and complements the radius of curvature and convex bend of an adjacent earpiece. The wheel well can be positioned about and in close proximity an adjacent earpieces. The eyeglasses can have left and right symmetrical parts 198 of the vehicle securely connected to the temples of the eyeglass frames such that the symmetrical parts of the vehicle have substantially symmetrical curved wheel wells conforming and complementing the bend and radius of curvature of earpieces.

The vehicle 188 can comprise: car, race car, stock car, police car, station wagon, van, recreational vehicle, antique vehicle, sports vehicle, colored vehicle, truck, tow truck, fire truck, bulldozer, excavator (excavation vehicle), dump truck, backhoe, garbage truck, snow mobile, off track vehicle, road vehicle, tank, construction vehicle, crane, bus, boat, jet ski, train, steam engine, train engine, or caboose. If desired, other vehicles can be used.

Some vehicles, such as a tractor, dump truck, bulldozer, etc. can be pivotally or fixedly connected to upward appendages that extend forwardly above the temples. Other vehicles, such as a backhoe, garbage truck, etc. can be pivotally of fixedly conned to upward appendages that extend rearwardly above the temples.

The eyeglass frame can comprise: a foldable eyeglass frame, a collapsible eyeglass frame, a rigid eyeglass frame, a semi-rigid eyeglass frame, a flexible eyeglass frame, a resilient eyeglass frame, a plastic eyeglass frame, a wire eyeglass frame, a metal eyeglass frame, a wooden eyeglass frame, a composite eyeglass frame, a white eyeglass frame, a black eyeglass frame, a yellow eyeglass frame, an orange eyeglass frame, a gold eyeglass frame, a brown eyeglass frame, a grey eyeglass frame, a blue eyeglass frame, a pink eyeglass frame, a red eyeglass frame, frame with hues of any of the preceding colors, or combinations thereof; and The optional lenses can comprise optical lenses, such as: plastic lenses, glass lenses, tinted lenses, transparent lenses, polarized lenses, photo chromic lenses, sunglass lenses, slit lenses, yellow lenses, amber lenses, grey lenses, brown lenses, black lenses, red lenses, pink lenses, blue lenses, lenses with hues of any of the preceding colors, three-dimensional (3D) lenses, and combination of any of the preceding.

Among the many advantages of the improved eyeglasses and novelty shades are:
1. Superior product design which can be worn at sporting events, pep rallies, amusement parks, popular concerts, car races, parties, and with costumes, such as at Halloween or Marti Gras.
2. Outstanding performance.
3. Fashionable.
4. Entertaining.
5. Safe.
6. User friendly.
7. Reliable.
8. Readily transportable.
9. Light weight.
10. Portable.
11. Comfortable.
12. Easy to use and wear.
13. Simple to manufacture.
14. Durable
15. Economical.
16. Attractive.

17. Fun.
18. Compact.
19. Efficient.
20. Effective.

Although embodiments and examples of the invention have been shown and described, it is to be understood that various modifications, substitutions, and rearrangements of parts, components, and/or process (method) steps, as well as other uses, shapes, construction, and design of the improved eyeglasses and novelty shades can be made by those skilled in the art without departing from the novel spirit and scope of this invention.

What is claimed is:

1. Eyeglasses, comprising:
an eyeglass assembly including
an eyeglass frame with rims, a bridge extending between and securely connecting said rims and for positioning said eyeglass frame on a nose of a person, said eyeglass frame having elongated temples connected to said rims, said elongated temples having earpieces for positioning said eyeglass frame on the person's ears, said earpieces each having an angle of curvature and a concave bend; and
imitation vehicles connected to said eyeglass frame along said elongated temples and positioned on said earpieces, said imitation vehicles positioned on and covering at least part of said earpieces when viewing the person's ears, and said imitations vehicles that are on or near the earpieces are positioned only on and above said earpieces and above the person's ears so as to avoid interfering with positioning said eyeglass frame on the person's ears; and
wherein said imitation vehicles includes symmetrical concave wheel wells conforming and complementing to said concave bend of said earpieces and facing the person's ears, said symmetrical concave wheel wells being secured to and positioned around said earpieces, said symmetrical concave wheel wells extending along said concave bend of said earpieces, and said symmetrical concave wheel wells being secured around the person's ears for holding and positioning the eyeglasses on the person; and
said earpieces being at least partially covered by said imitation vehicles when viewing the person's ears.

2. Eyeglasses in accordance with claim 1 wherein:
said frame is of a size and shape so that the eyeglasses can be worn by a wearer comprising a person selected from the group consisting of a child or adult;
said eyeglasses are selected from the group consisting of: sunglasses, novelty sunglasses, fanciful shades, three dimensional (3D) glasses, eyewear, fashion eyeglasses, designer sunglasses, and specialty eyeglasses;
at least part of said imitation vehicles are positioned at an elevation above the ears of the person when the person is wearing the eyeglasses; and
wherein said imitation vehicles are selected from the group consisting of: a van, recreational vehicle, truck, tow truck, fire truck, bulldozer, excavator, dump truck, backhoe, garbage truck, snow mobile, tank, construction vehicle, crane, bus, boat, jet ski, steam engine, and train engine.

3. Eyeglasses comprising:
an eyeglass assembly including
lenses;
a frame with rims for holding said lenses and having temples with earpieces that fit upon the ears of a user when the eyeglasses are being worn by the user, said earpieces each having an angle of curvature and concave bend; and
an imitation vehicle secured to said eyeglass frame along one of said temples and positioned on the earpiece on said one of said temples, and said imitation vehicle that is positioned on or near the earpiece on said one of said temples is positioned only on and above the earpiece on said one of said temples so that the earpieces can fit upon the ears of the user; and
wherein said imitation vehicle includes a concave wheel well conforming and complementing to said angle of curvature and said concave bend of the earpiece on said one of said temples and facing the ear of the user around the earpiece on said one of said temples, said concave wheel well being secured to and positioned around the earpiece on said one of said temples, said concave wheel well extends along said concave bend of the earpiece on said one of said temples, and said concave wheel well is secured to and fits around the ear of the user on the earpiece on said one of said temples for holding the eyeglasses on the user.

4. Eyeglasses in accordance with claim 3 wherein said imitation vehicle is selected from the group consisting of a: van, recreational vehicle, truck, tow truck, fire truck, bulldozer, excavator, dump truck, backhoe, garbage truck, snow mobile, tank, construction vehicle, crane, bus, boat, jet ski, steam engine, and train engine.

5. Eyeglasses in accordance with claim 3 including at least one image on said eyeglass assembly;
said image being at a location selected from the group consisting of the inside of the eyeglass assembly, the outside of the eyeglass assembly, an inwardly facing surface of a lens, an outwardly facing surface of said lens, an inwardly facing surface of said eyeglass frame, and an outwardly facing surface of said eyeglass frame; and
said image being selected from the group consisting of a logo, indicia, symbol, design, trademark, service mark, brand name, company name, black indicia, white indicia, colored indicia, characters, letters, words, numbers, graphics, flag, hologram, laser etched image, embossed image, imprinted image, stamped image, screen printed image, printed image, anodized image, etched image, lithograph image, decal image, engraved image, and combinations of any of the preceding.

6. Eyeglasses in accordance with claim 3 including
at least one upward appendage connected to said temples of said frame; and
part of said imitation vehicle is connected to said upward appendage and extends forwardly or rearwardly at an elevation above said temples.

7. Eyeglasses in accordance with claim 3 wherein:
said imitation vehicle having left and right symmetrical parts connected to said temples with substantially symmetrical concave wheel wells positioned about said earpieces;
said frame selected from the group consisting of: a foldable eyeglass frame, a collapsible eyeglass frame, a rigid eyeglass frame, a semi-rigid eyeglass frame, a flexible eyeglass frame, a resilient eyeglass frame, a plastic eyeglass frame, a wire eyeglass frame, a metal eyeglass frame, a wooden eyeglass frame, a composite eyeglass frame, a white eyeglass frame, a black eyeglass frame, a yellow eyeglass frame, an orange eyeglass frame, a gold eyeglass frame, a brown eyeglass frame, a grey eyeglass frame, a blue eyeglass frame, a pink eyeglass frame, a red eyeglass frame, frame with hues of any of the preceding colors, and combinations thereof; and said lenses comprise optical lenses selected from the group consisting of plastic lenses, glass lenses, tinted lenses, transparent lenses, polarized lenses, photo chromic lenses, sunglass lenses, slit lenses, yellow lenses, amber lenses, grey lenses, brown lenses, black lenses, red lenses, pink lenses, blue lenses, lenses with hues of any of the preceding colors, three-dimensional (3D) lenses, and combination of any of the preceding.

* * * * *